United States Patent
Suh et al.

(10) Patent No.: US 8,337,805 B1
(45) Date of Patent: Dec. 25, 2012

(54) METHOD FOR PREPARING MAGNETITE NANOPARTICLES FROM LOW-GRADE IRON ORE AND MAGNETITE NANOPARTICLES PREPARED BY THE SAME

(75) Inventors: Yong Jae Suh, Daejeon (KR); Myung Eun Ju, Daejeon (KR); Dae Sup Kil, Daejeon (KR); Hee Dong Jang, Daejeon (KR)

(73) Assignee: Korea Institute of Geoscience and Mineral Resources (KR)

( * ) Notice: Subject to any disclaimer, the term of this patent is extended or adjusted under 35 U.S.C. 154(b) by 0 days.

(21) Appl. No.: 13/306,857

(22) Filed: Nov. 29, 2011

(30) Foreign Application Priority Data

Nov. 8, 2011 (KR) .................. 10-2011-0115662

(51) Int. Cl.
*C01G 49/00* (2006.01)
(52) U.S. Cl. ........ 423/632; 423/140; 423/142; 977/775; 977/811
(58) Field of Classification Search .......... 423/140, 423/142, 335, 339, 632, 633; 419/19; 977/775–777, 977/811
See application file for complete search history.

(56) References Cited

U.S. PATENT DOCUMENTS 2,409,428 A * 10/1946 Gardner .................... 423/49
3,843,540 A * 10/1974 Reimers et al. ............. 252/62.52
7,550,618 B2 * 6/2009 Jang et al. ................. 556/147

FOREIGN PATENT DOCUMENTS

KR 1020030023153 3/2003
KR 1020090039271 4/2009

OTHER PUBLICATIONS

De Vicente, I. et al. 'On the use of magnetic nano and microparticles for lake restoration' 2010, Journal of Hazardous Materials, vol. 181, pp. 375-381.
Iwasaki, T. et al. 'Size control of magnetite nanoparticles by organic solvent-free chemical coprecipitation at room temperature' Journal of Experimental Nanoscience, Jun. 2010, vol. 5, No. 3, pp. 251-262.
Ling, M. et al. 'Highly Water-Soluble Magnetic Nanoparticles as Novel Draw Solutes in Forward Osmosis for Water Reuse' 2010, Ind. Chem. Res., vol. 49, pp. 5869-5876.
Lu, A-H., et al. 'Magnetic Nanoparticles: Synthesis, Protection, Functionalization, and Application' 2007, Angew. Chem. Int. Ed., vol. 46, pp. 1222-1244.
Massart, R. 'Preparation of Aqueous Magnetic Liquids in Alkaline and Acidic Media' IEEE Transactions on Magnetics, Mar. 1981, vol. MAG-17, No. 2, pp. 1247-1248.

(Continued)

*Primary Examiner* — Steven Bos
(74) *Attorney, Agent, or Firm* — Bret E. Field; Bozicevic, Field & Francis LLP (57) ABSTRACT

The present invention provides a method for preparing magnetite nanoparticles from low-grade iron ore and magnetite nanoparticles prepared by the same. According to the method of the present invention, in which iron ore leachate is obtained by adding low-grade iron ore powder to an acidic solution, Si and Mg that inhibit the formation of magnetite nanoparticles present in the leachate are selectively removed, iron hydroxide ($Fe(OH)_3$) is allowed to be precipitated from a supernatant containing $Fe^{2+}$ ions and $Fe^{3+}$ ions, a mixed iron solution containing $Fe^{2+}$ ions and $Fe^{3+}$ ions is prepared using the iron hydroxide ($Fe(OH)_3$), and the mixed iron solution is added to an alkaline solution to react, thereby preparing magnetite nanoparticles.

11 Claims, 4 Drawing Sheets

OTHER PUBLICATIONS

Shipley, H.J. et al. 'Adsorption of Arsenic to Magnetite Nanoparticles: Effect of Particle Concentration, PH, Ionic Strength, and Temperature' 2009, Environmental Toxicology and Chemistry, vol. 28, No. 3, pp. 509-515.

Yuan, P. et a. 'Removal of hexavalent chromium [Cr(VI)] from aqueous solutions by the diatomite-supported/unsupported magnetite nanoparticles' 2010, Journal of Hazardous Materials, vol. 173, pp. 614-621.

* cited by examiner

FIGURE 1

Magnetite nanoparticles prepared with commercial reagents

Example 1

Example 2

METHOD FOR PREPARING MAGNETITE NANOPARTICLES FROM LOW-GRADE IRON ORE AND MAGNETITE NANOPARTICLES PREPARED BY THE SAME

CROSS-REFERENCE TO RELATED APPLICATION

This application claims priority to and the benefit of Korean Patent Application No. 10-2011-115662, filed on Nov. 8, 2011, the disclosure of which is incorporated herein by reference in its entirety.

BACKGROUND

1. Field of the Invention

The present invention relates to a method for preparing magnetite nanoparticles from low-grade iron ore and magnetite nanoparticles prepared by the same.

2. Discussion of Related Art

Magnetite ($Fe_3O_4$) nanoparticles are suitable as a heavy metal adsorbent in wastewater treatment due to high heavy metal adsorption capacity, can be easily recovered after use due to excellent magnetic properties (Shipley, H. J., Yean, S., Kan, A. T., Tomson, M. B., Adsorption of arsenic to magnetite nanoparticles: Effect of particle concentration, pH, ionic strength, and temperature, Environ. Toxicol. Chem., 28, 509-15 (2009); de Vicente, I., Merino-Martos, A., Cruz-Pizarro, L., de Vicente, J., On the use of magnetic nano and microparticles for lake restoration, J. Hazard. Mater., 181, 375-81 (2010); Yuan, P., Liu, D., Fan, M., Yang, D, Zhu, R, Ge, F., Zhu, J. X., He, H., Removal of hexavalent chromium [Cr(VI)] from aqueous solutions by the diatomite-supported/unsupported magnetite nanoparticles, J. Hazard. Mater., 173, 614-21, (2010)), and can be used as a solute in a purification or desalination plant using osmosis due to water retention properties (Ling, M. M., Wang, K. Y., Chung, T.-S., Highly water-soluble magnetic nanoparticles as novel draw solutes in forward osmosis for water reuse, Ind. Eng. Chem. Res., 49, 5869-76 (2010)).

The magnetite nanoparticles having the above-mentioned properties can be prepared by various methods such as coprecipitation, thermal decomposition, micro-emulsion, hydrothermal synthesis, etc. (Lu, An-Hui, Salabas, E. L., Sch, Ferdi, Magnetic nanoparticles: Synthesis, protection, functionalization, and application, Angew. Chem. Int. Ed., 46, 1222-44 (2007)). Among them, according to the coprecipitation, the magnetite nanoparticles are prepared by dissolving an iron salt in water and allowing the solution to react at a relatively low temperature and at atmospheric pressure for several tens of minutes. Therefore, the coprecipitation is economic and suitable for mass production. Researchers have extensively studied various methods for preparing magnetite nanoparticles using the coprecipitation and, as an example thereof, a method for preparing a nanofluid, in which magnetite nanoparticles are prepared by coprecipitation and stably dispersed in a dispersion medium, has been developed (U.S. Pat. No. 3,843,540; Massart, R., Preparation of aqueous magnetic liquids in alkaline and acidic media, IEEE Trans. Magnetics MAG-17 (2), 1247-8 (1981)). Recently, Iwasaki et al. have developed a method for preparing magnetite nanoparticles at room temperature using various iron salts by coprecipitation (Iwasaki, T., Mizutani, N., Watano, S., Yanagida, T., Kawai, T., Size control of magnetite nanoparticles by organic solvent-free chemical coprecipitation at room temperature, J. Exp. Nanosci., 5, 25162 (2010)). Moreover, Korean Patent No. 10-442541 discloses a method for preparing magnetite nanoparticles using a ferrous sulfate salt by precipitation with multiple steps.

Commercially available high-purity iron salts such as $FeCl_2$, $FeCl_3$, $Fe(CH_3COO)_2$, $Fe(CO)_5$, etc. have been used as starting materials in the preparation of magnetite nanoparticles in the conventional methods including the above-mentioned literatures. However, the high-purity iron salts are expensive, which is problematic.

Even if the expensive high-purity raw materials are used in industrial fields such as magnetic resonance imaging (MRI) contrast agents, catalysts, dust-proof seals, etc., the added value of the final product is high, which can sustain economic feasibility. However, in industrial fields such as wastewater treatment or desalination plants, the economic feasibility can be achieved when the cost of the raw materials is reduced. Moreover, in the industrial fields such as wastewater treatment or desalination plants, the amount of water to be treated is significant, and thus the demand for magnetite nanoparticles is significant. Therefore, in order to apply the magnetite nanoparticles in the industrial fields such as wastewater or desalination plants, it is necessary to develop a plan to reduce the cost of magnetite nanoparticles.

In order to solve the above-described problems, many researchers have extensively studied various methods for preparing high-purity iron salts from low-grade ores. As an example thereof, Korean Patent No. 10-905403 and U.S. Pat. No. 7,550,618 disclose a preparation of iron (II) acetate powder from low-grade magnetite. However, the process of preparing a nano-material by synthesizing a high-purity iron salt such as iron (II) acetate, iron chloride, etc. from low-grade iron ore and using the iron salt as a starting material is complex and costly.

Therefore, it is necessary to provide a simplified process which can prepare magnetite nanoparticles from an inexpensive starting material without intermediate steps such as the synthesis of an iron salt, etc.

SUMMARY OF THE INVENTION

While the inventors of the present invention have studied the method for preparing magnetite nanoparticles directly from low-grade iron ore, they prepared the magnetite nanoparticles by adding low-grade iron ore powder to an acidic solution to obtain iron ore leachate, selectively removing Si and Mg that inhibit the formation of magnetite nanoparticles present in the leachate, allowing iron hydroxide ($Fe(OH)_3$) to be precipitated from a supernatant containing $Fe^{2+}$ ions and $Fe^{3+}$ ions, preparing a mixed iron solution containing $Fe^{2+}$ ions and $Fe^{3+}$ ions using the iron hydroxide ($Fe(OH)_3$), and adding the mixed iron solution to an alkaline solution to react, and they found that the content of Fe in the prepared magnetite nanoparticles was higher than that of the iron ore powder and the contents of Si and Mg that inhibit the formation of magnetite nanoparticles were significantly reduced, thereby completing the present invention.

Therefore, the present invention provides a method for preparing magnetite nanoparticles from low-grade iron ore and magnetite nanoparticles prepared by the same.

An object of the present invention is to provide a method for preparing magnetite nanoparticles from low-grade iron ore, comprising:

(1) obtaining iron ore leachate by adding iron ore powder to an acidic solution and stirring the mixture at 90 to 110° C. for 1 to 3 hours;

(2) diluting the iron ore leachate with distilled water, separating and discharging residual undissolved powder by centrifugation, removing silica from the iron ore leachate by coprecipitation or polymer adsorption, thereby obtaining a supernatant;

(3) adding an oxidant to the supernatant to oxidize all $Fe^{2+}$ ions to $Fe^{3+}$ ions, adding an alkaline solution thereto to allow the $Fe^{3+}$ ions to be precipitated as iron hydroxide, thereby obtaining an iron hydroxide ($Fe(OH)_3$);

(4) adding the iron hydroxide ($Fe(OH)_3$) obtained in step (3) to an acidic solution to prepare a solution containing $Fe^{3+}$ ions, preparing a solution containing $Fe^{2+}$ ions by adding a reducing agent to one-third of the solution containing $Fe^{3+}$ ions to reduce the $Fe^{3+}$ ions to $Fe^{2+}$ ions, and preparing a mixed iron solution by adding the solution containing $Fe^{2+}$ ions to the rest of the solution containing $Fe^{3+}$ ions; and (5) adding the mixed iron solution prepared in step (4) to an alkaline solution, allowing the resulting mixture to react at 30 to 50° C. for 5 to 20 minutes, thereby preparing magnetite nanoparticles.

Moreover, another object of the present invention is to provide magnetite nanoparticles prepared by the above-described method.

Hereinafter, the present invention will be described in detail.

The method for preparing magnetite nanoparticles from low-grade iron ore according to the present invention is characterized in that iron ore leachate is obtained by adding low-grade iron ore powder to an acidic solution, Si and Mg that inhibit the formation of magnetite nanoparticles present in the leachate are selectively removed, iron hydroxide ($Fe(OH)_3$) is allowed to be precipitated from a supernatant containing $Fe^{2+}$ ions and $Fe^{3+}$ ions, a solution containing $Fe^{3+}$ is prepared by adding the iron hydroxide ($Fe(OH)_3$) to an acidic solution, a solution containing $Fe^{2+}$ ions is prepared by adding a reducing agent to a portion of the solution containing $Fe^{3+}$ ions to reduce the $Fe^{3+}$ ions to $Fe^{2+}$ ions, a mixed iron solution is prepared by adding the solution containing $Fe^{2+}$ ions to the rest of the solution containing $Fe^{3+}$ ions, the mixed iron solution is added to an alkaline solution, and the resulting mixture is allowed to react, thereby preparing magnetite nanoparticles.

The method for preparing magnetite nanoparticles from low-grade iron ore according to the present invention will be described in more detail step by step as follows.

Step (1) is to obtain iron ore leachate as follows. First, after low-grade raw iron ore is crushed, iron ore powder less than 149 microns is sieved through a No. 100 sieve. The sieved iron ore powder is added to an acidic solution and stirred at 90 to 110° C. for 1 to 3 hours, thereby obtaining iron ore leachate.

The low-grade iron ore contains 30 to 70 wt % of iron.

Preferably, the acidic solution may be, but not limited to, a hydrochloric acid solution or a sulfuric acid solution.

In step (2), the Si and Mg that inhibit the formation of magnetite nanoparticles are removed from the iron ore leachate. The iron ore leachate is diluted with distilled water and centrifuged to separate and discharge residual undissolved powder. Then, the silica present in the iron ore leachate is removed by coprecipitation or polymer adsorption, thereby obtaining a supernatant.

The process of removing the silica present in the iron ore leachate by coprecipitation is as follows. A reducing agent in an amount of 0.5 to 0.7 times the number of moles of $Fe^{3+}$ ions is added to the iron ore leachate and stirred to reduce all $Fe^{3+}$ ions contained in the iron ore leachate to $Fe^{2+}$ ions. An alkaline solution is slowly added to the leachate to adjust the pH of the leachate to 4 to 5. Then, the $Fe^{2+}$ ions are present in a dissolved state in the leachate, and $Al^{3+}$ ions are precipitated as $Al(OH)_3$ and adsorbed and coprecipitated with $SiO_2$. A precipitate containing the $Al(OH)_3$ and $SiO_2$ as main components is removed by centrifugation, thereby obtaining a supernatant containing $Fe^{2+}$ ions. The reducing agent may include, but not limited to, $NaBH_4$ or $LiBH_4$.

The process of removing the silica present in the iron ore leachate by polymer adsorption is as follows. A polymer flocculant solution is added to the iron ore leachate, and the resulting mixture is stirred and centrifuged to remove flocculated particles of a silica-polymer flocculant, thereby obtaining a supernatant containing $Fe^{2+}$ ions and $Fe^{3+}$ ions.

The polymer flocculant solution may be prepared by dissolving 0.2 to 0.5 wt % of polymer flocculant in 400 ml of distilled water. Preferably, the polymer flocculant may be a non-ionic organic polymer flocculant. The non-ionic organic polymer flocculant may include: polyethylene oxide (PEO); polyethylene glycol alkyl ethers such as polyethylene glycol dodecyl ether, polyethylene glycol tridecyl ether, polyethylene glycol hexadecyl ether, polyethylene glycol octadecyl ether, etc.; polyethylene glycol alkyl phenyl ethers such as polyoxyethylene isooctylphenyl ether, polyoxyethylene tetramethylbutyl phenyl ether, etc.; polysorbates such as polyoxyethylene sorbitan monolaurate, polyoxyethylene sorbitan monostearate, polyoxyethylene sorbitan monooleate, etc.; and poloxamer, but not limited thereto.

Step (3) is to obtain iron hydroxide ($Fe(OH)_3$) as follows. An oxidant is added to the supernatant obtained in step (2) to oxidize all $Fe^{2+}$ ions to $Fe^{3+}$ ions, and an alkaline solution is added thereto to allow the $Fe^{3+}$ ions to be precipitated as iron hydroxide ($Fe(OH)_3$). Preferably, the oxidant may be, but not limited to, $H_2O_2$.

Step (4) is to prepare a mixed iron solution containing $Fe^{2+}$ ions and $Fe^{3+}$ ions as follows. The iron hydroxide ($Fe(OH)_3$) obtained in step (3) is added to an acidic solution to prepare a solution containing $Fe^{3+}$ ions, a solution containing $Fe^{2+}$ ions is prepared by adding a reducing agent to one-third of the solution containing $Fe^{3+}$ ions to reduce the $Fe^{3+}$ ions to $Fe^{2+}$ ions, and the solution containing $Fe^{2+}$ ions is added to the rest of the solution containing $Fe^{3+}$ ions, thereby preparing the mixed iron solution. The reducing agent may include, but not limited to, $NaBH_4$ or $LiBH_4$.

Step (5) is to prepare magnetite nanoparticles as follows. The mixed iron solution containing $Fe^{2+}$ ions and $Fe^{3+}$ ions prepared in step (4) is added to an alkaline solution, and the resulting mixture is allowed to react at 30 to 50° C. for 5 to 20 minutes, thereby preparing the magnetite nanoparticles. The thus prepared magnetite nanoparticles are separated from water using a magnet and washed with distilled water.

The alkaline solution used in each step may include, but not limited to, NaOH solution, KOH solution, $Ca(OH)_2$ solution, $NH_4OH$ solution, etc.

In the magnetite nanoparticles prepared by the above-described method, the Fe content is higher than that in the raw iron ore powder, and the contents of Si and Mg that inhibit the formation of magnetite nanoparticles are significantly reduced. Typically, when the Mg is present in excess of 23 wt %, it inhibits the formation of magnetite nanoparticles. The magnetite nanoparticles prepared by the above-described method contains 90 to 95 wt % of Fe, 0.1 to 0.5 wt % of Si, and 1 to 5 wt % of Mg. The magnetite nanoparticles have high magnetization (i.e., magnetic moment per unit volume) and a coercive force of 0, and thus the magnetite nanoparticles can be easily recovered from water treatment plants, etc. and reused.

As such, according to the method for preparing magnetite nanoparticles from low-grade iron ore of the present invention, in which iron ore leachate is obtained by adding low-grade iron ore powder to an acidic solution, Si and Mg that inhibit the formation of magnetite nanoparticles present in the leachate are selectively removed, iron hydroxide ($Fe(OH)_3$) is allowed to be precipitated from a supernatant containing $Fe^{2+}$ ions and $Fe^{3+}$ ions, a mixed iron solution containing $Fe^{2+}$ ions and $Fe^{3+}$ ions is prepared using the iron hydroxide ($Fe(OH)_3$), and the mixed iron solution is added to an alkaline solution to react, thereby preparing magnetite nanoparticles, the content of Fe in the prepared magnetite nanoparticles is higher than that of the iron ore powder and the contents of Si and Mg that inhibit the formation of magnetite nanoparticles is significantly reduced. Moreover, the method for preparing magnetite nanoparticles from low-grade iron ore according to the present invention does not employ intermediate steps, which reduces the processing costs. Furthermore, it is possible to supply the high-efficiency magnetite nanoparticles, which can be industrially used in wastewater treatment or desalination plants, in quantities at low cost. In addition, it is possible to effectively treat livestock wastewater, heavy metal wastewater, oil spilling into rivers, etc. at low costs, thereby significantly contributing to the prevention of environmental pollution.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, preferred examples are provided for a better understanding of the present invention. However, the following examples are not intended to limit the scope of the invention.

Example 1

Preparation of Magnetite Nanoparticles from Low-Grade Iron Ore

After raw iron ore was crushed, iron ore powder less than 149 microns was sieved through a No. 100 sieve. 50 g of the sieved iron ore powder and 200 ml of a 4 M hydrochloric acid were placed in a 1 L beaker and stirred at 100° C. for 2 hours, thereby obtaining iron ore leachate. 200 ml of distilled water was added to the iron ore leachate to be diluted, and the resulting iron ore leachate was centrifuged at 10,000 rpm for 10 minutes to separate and discharge residual undissolved powder. 45 ml of a solution prepared by dissolving 0.01 wt % of $NaBH_4$ (0.6 times the number of moles of $Fe^{3+}$ ions) as a reducing agent in distilled water was added to the iron ore leachate and stirred for 30 minutes such that all $Fe^{3+}$ ions contained in the iron ore leachate were reduced to $Fe^{2+}$ ions. Then, a 0.5 M NaOH solution was slowly added to the resulting leachate to adjust the pH of the leachate to 4.7 to 5. Then, the $Fe^{2+}$ ions were present in a dissolved state in the leachate, and $Al^{3+}$ ions were precipitated as $Al(OH)_3$ and adsorbed and coprecipitated with $SiO_2$. A precipitate containing the $Al(OH)_3$ and $SiO_2$ as main components was removed by centrifugation, thereby obtaining a supernatant containing $Fe^{2+}$ ions.

10.4 ml of a 9.8 M $H_2O_2$ as an oxidant was added to the supernatant such that all $Fe^{2+}$ ions were oxidized to $Fe^{3+}$ ions, and a 0.5 M NaOH solution was slowly added to the resulting leachate such that the $Fe^{3+}$ ions were precipitated as iron hydroxide ($Fe(OH)_3$). The iron hydroxide ($Fe(OH)_3$) was dissolved in 50 ml of a 2 M HCl, one-third of the solution was placed in a separate beaker, and 23 ml of a solution prepared by dissolving 0.01 wt % of $NaBH_4$ as a reducing agent in distilled water was added thereto such that the $Fe^{3+}$ ions were reduced to $Fe^{2+}$ ions. Then, the $Fe^{2+}$ solution was mixed with the rest two-third of the $Fe^{3+}$ solution to prepare a mixed iron solution. The mixed iron solution was added to 100 ml of a 1.5 M NaOH solution to react at 40° C. for 10 minutes, thereby forming magnetite nanoparticles. The thus prepared magnetite nanoparticles were separated from water using a magnet and washed with distilled water.

Example 2

Preparation of Magnetite Nanoparticles from Low-Grade Iron Ore

After raw iron ore was crushed, iron ore powder less than 149 microns was sieved through a No. 100 sieve. 50 g of the sieved iron ore powder and 200 ml of a 4 M hydrochloric acid were placed in a 1 L beaker and stirred at 100° C. for 2 hours, thereby obtaining iron ore leachate. 200 ml of distilled water was added to the iron ore leachate to be diluted, and the resulting iron ore leachate was centrifuged at 10,000 rpm for 10 minutes to separate and discharge residual undissolved powder. A solution prepared by dissolving 0.25 wt % of polyethylene oxide (PEO) as a polymer flocculant in 400 ml of distilled water was added to the iron ore leachate, and the resulting leachate was stirred for 30 minutes and centrifuged at 10,000 rpm for 10 minutes to separate silica-PEO flocculated particles, thereby obtaining a supernatant containing $Fe^{2+}$ ions and $Fe^{3+}$ ions. 3.7 ml of a 9.8 M $H_2O_2$ as an oxidant was added to the supernatant such that all $Fe^{2+}$ ions were oxidized to $Fe^{3+}$ ions, and a 0.5 M NaOH solution was slowly added to the resulting leachate such that the $Fe^{3+}$ ions were precipitated as iron hydroxide ($Fe(OH)_3$). The iron hydroxide ($Fe(OH)_3$) was dissolved in 50 ml of a 2 M HCl, one-third of the solution was placed in a separate beaker, and 23 ml of a solution prepared by dissolving 0.01 wt % of $NaBH_4$ as a reducing agent in distilled water was added thereto such that the $Fe^{3+}$ ions were reduced to $Fe^{2+}$ ions. Then, the $Fe^{2+}$ solution was mixed with the rest two-third of the $Fe^{3+}$ solution to prepare a mixed iron solution. The mixed iron solution was added to 100 ml of a 1.5 M NaOH solution to react at 40° C. for 10 minutes, thereby forming magnetite nanoparticles. The thus prepared magnetite nanoparticles were separated from water using a magnet and washed with distilled water.

Figure 1:
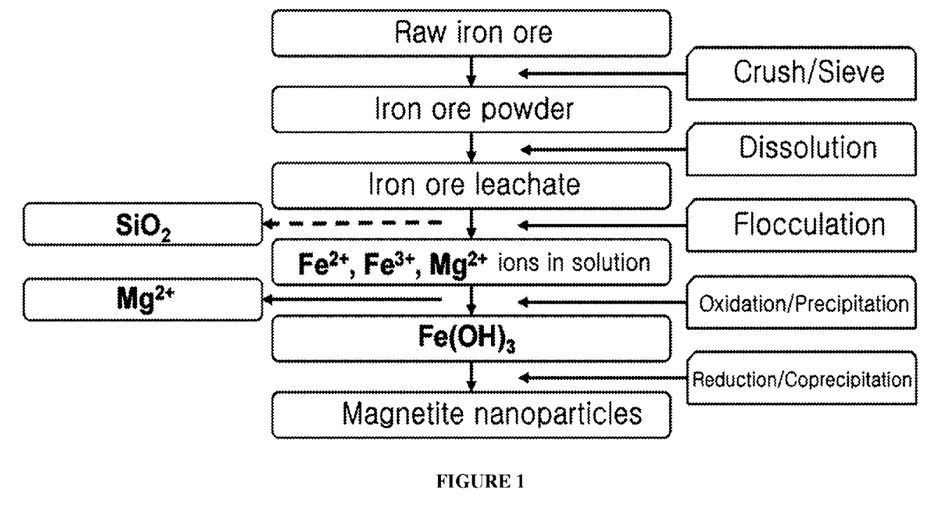
FIG. 1 is a schematic diagram showing a process of preparing magnetite nanoparticles from low-grade iron ore in accordance with the present invention.
Figure 2:
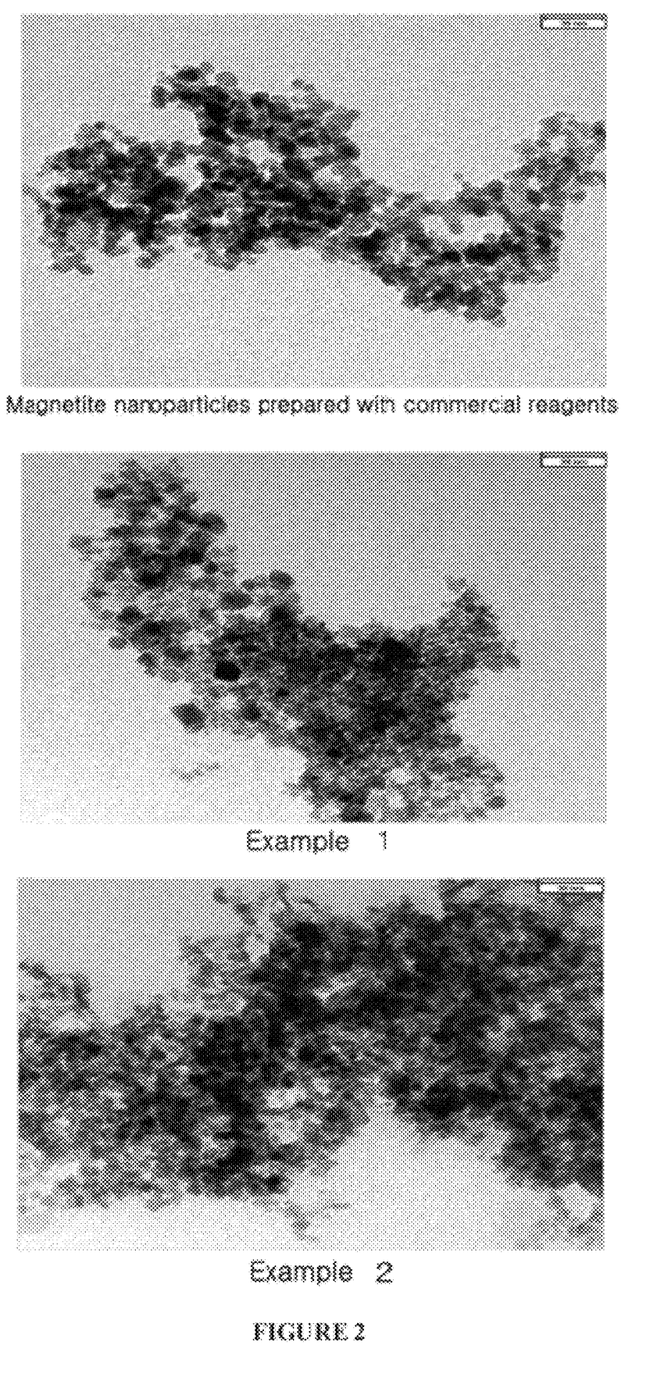
FIG. 2 shows transmission electron microscope (TEM) images of magnetite nanoparticles according to the present invention.
Figure 3:
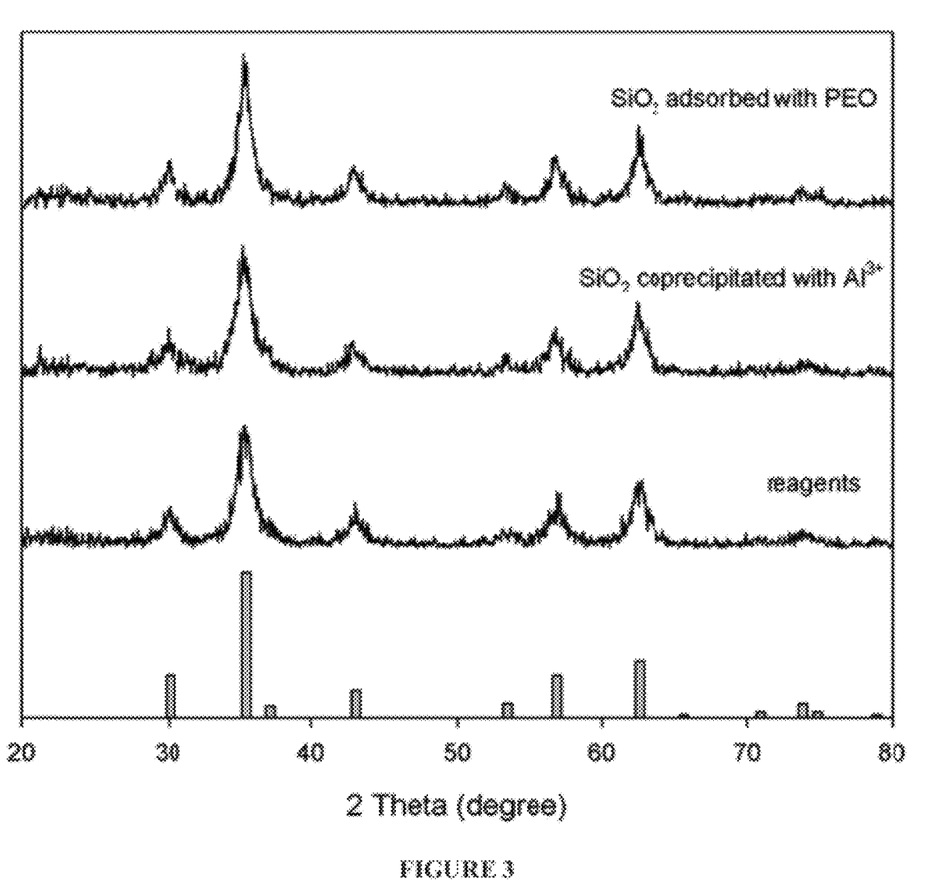
FIG. 3 shows X-ray diffraction patterns of magnetite nanoparticles according to the present invention.
Figure 4:
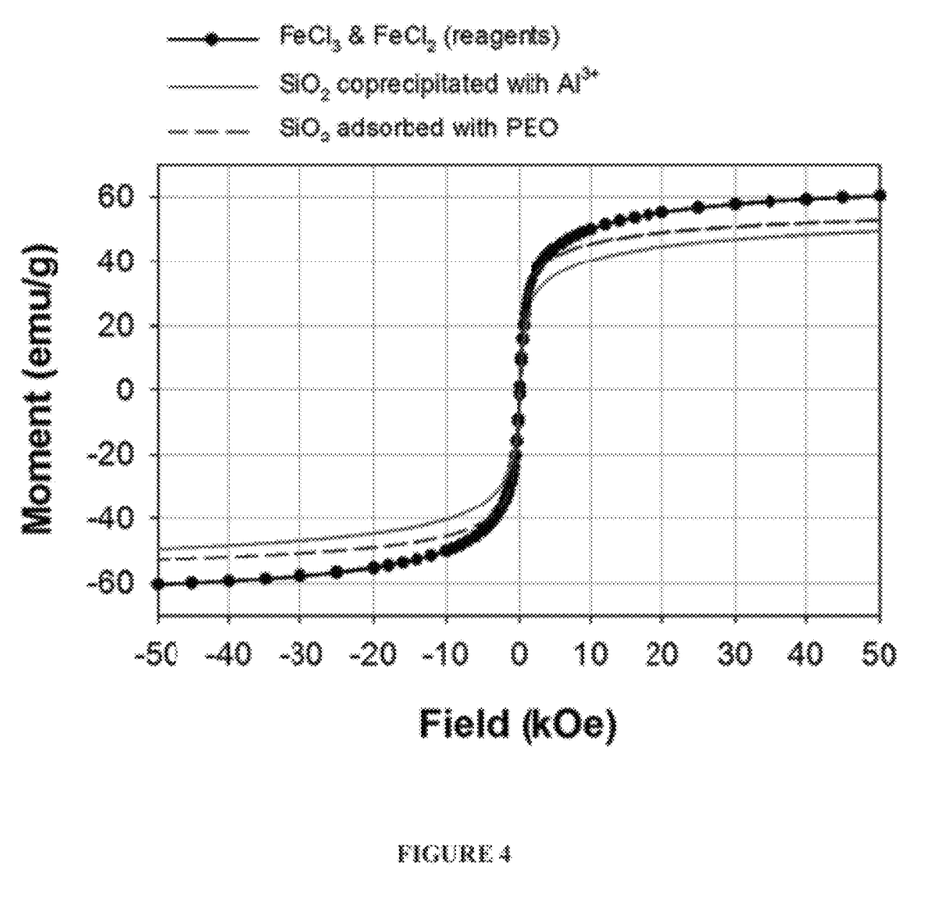
FIG. 4 shows magnetization curves of magnetite nanoparticles according to the present invention.

The process of preparing magnetite nanoparticles from low-grade iron ore according to the present invention is shown in FIG. 1, and the transmission electron microscope (TEM) images, X-ray diffraction patterns, and magnetization curves of the magnetite nanoparticles prepared in Examples 1 and 2 are shown in FIGS. 2 to 4, respectively.

As shown in FIG. 2, the shape and size of the magnetite nanoparticles according to the present invention are slightly non-uniform compared to those of the magnetite nanoparticles prepared with commercial reagents. The reason for this is considered that various types of metal components partially inhibit the growth of magnetite nanoparticles.

Moreover, as shown in FIG. 3, the X-ray diffraction pattern of the magnetite nanoparticles according to the present invention is almost the same as those of the magnetite nanoparticles prepared with commercial reagents.

Furthermore, as shown in FIG. 4, the magnetite nanoparticles according to the present invention have a coercive force of 0, and thus the magnetite nanoparticles lose their magnetic properties, when there is no external magnetic field, like paramagnetic nanoparticles and can be easily dispersed in a dispersion medium. In addition, the magnetite nanoparticles according to the present invention have saturation magnetization of 49.4 emu/g (Example 1) and 53.0 emu/g (Example 2), which are slightly lower than that of 60.3 emu/g of the magnetite nanoparticles prepared with commercial reagents, and thus the magnetite nanoparticles can be recovered from water treatment plants, etc. and reused without any problems. This coincides with the fact that the magnetite nanoparticles prepared by the method of the present invention could be easily separated from the solvent using a magnet without the use of separate equipment such as a centrifuge.

Experimental Example 1

Measurement of Composition of Metal Components Contained in Magnetite Nanoparticles The composition of metal components contained in the magnetite nanoparticles prepared in Examples 1 and 2 and in the raw iron ore powder were measured by wet chemical analysis and inductively coupled plasma atomic emission spectrometry (ICP-AES, Jobin-Yvon, JY 38 plus, France), and the results are shown in Table 1.

TABLE 1

| | Concentration of elements (wt %) | | |
|---|---|---|---|
| | | Magnetite nanoparticles | |
| Composition | Raw iron ore powder | Coprecipitation of $Al^{3+}$ and $SiO_2$ (Example 1) | Removal of $SiO_2$ by PEO adsorption (Example 2) |
| Fe | 69.60 | 94.12 | 91.93 |
| Si | 9.98 | 0.27 | 0.35 |
| Al | 1.67 | 0.22 | 1.50 |
| Mg | 14.66 | 4.50 | 4.85 |
| Ca | 1.89 | 0.43 | 0.49 |
| Mn | 1.91 | 0.36 | 0.64 |
| Zn | 0.17 | 0.08 | 0.16 |
| P | 0.02 | 0.01 | 0.03 |
| Ti | 0.10 | 0.01 | 0.05 |
| Total | 100.00 | 100.00 | 100.00 |

As shown in Table 1, the content of Fe contained in the magnetite nanoparticles of the present invention was increased from 69.60% of the raw iron ore powder to 94.12% in Example 1 and 91.93% in Example 2, respectively. Moreover, the contents of Si and Mg that inhibit the formation of magnetite nanoparticles were significantly reduced in the magnetite nanoparticles prepared in Examples 1 and 2. The contents of Mg in the magnetite nanoparticles prepared in Examples 1 and 2 were reduced to one-third of the raw iron ore powder. Typically, when the Mg is present in excess of 23 wt %, it inhibits the formation of magnetite nanoparticles. While the content of Al was significantly reduced in the magnetite nanoparticles (Example 1) from which $SiO_2$ was removed by coprecipitation of $Al^{3+}$ and $SiO_2$, the content of Al remained at an almost equal level in the magnetite nanoparticles (Example 2) from which $SiO_2$ was removed by PEO adsorption.

As described above, according to the method for preparing the magnetite nanoparticles of the present invention, the content of Fe contained in the magnetite nanoparticles can be increased, and the contents of Si and Mg that inhibit the formation of magnetite nanoparticles can be significantly reduced. Moreover, the method for preparing magnetite nanoparticles from low-grade iron ore according to the present invention does not employ intermediate steps, which reduces the processing costs. Furthermore, it is possible to supply the high-efficiency magnetite nanoparticles, which can be industrially used in wastewater treatment or desalination plants, in quantities at low cost. In addition, it is possible to effectively treat livestock wastewater, heavy metal wastewater, oil spilling into rivers, etc. at low costs, thereby significantly contributing to the prevention of environmental pollution.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for preparing magnetite nanoparticles from low-grade iron ore, comprising:
    (1) adding iron ore powder to an acidic solution and stirring the mixture at 90 to 110° C. for 1 to 3 hours to obtain iron ore leachate;
    (2) diluting the iron ore leachate with distilled water, separating and discharging residual undissolved powder by centrifuging, removing silica from the iron ore leachate by coprecipitation or polymer adsorption, thereby obtaining a supernatant;
    (3) adding an oxidant to the supernatant to oxidize all $Fe^{2+}$ ions to $Fe^{3+}$ ions, adding an alkaline solution thereto to precipitate the $Fe^{3+}$ ions as iron hydroxide;
    (4) adding the iron hydroxide to an acidic solution to prepare a solution containing $Fe^{3+}$ ions, preparing a solution containing $Fe^{2+}$ ions by adding a reducing agent to one-third of the solution containing $Fe^{3+}$ ions to reduce the $Fe^{3+}$ ions to $Fe^{2+}$ ions, and preparing a mixed iron solution by adding the solution containing $Fe^{2+}$ ions to the rest of the solution containing $Fe^{3+}$ ions; and
    (5) adding the mixed iron solution to an alkaline solution, and reacting at 30 to 50° C. for 5 to 20 minutes, to prepare magnetite nanoparticles.

2. The method of claim 1, wherein in step (1), the iron ore powder comprises 30 to 70 wt % of iron.

3. The method of claim 1, wherein in step (1) and step (4), the acidic solution is a hydrochloric acid solution or a sulfuric acid solution.

4. The method of claim 1, wherein in step (2), the coprecipitation is performed by adding a reducing agent to the iron ore leachate to reduce all $Fe^{3+}$ ions contained in the iron ore leachate to $Fe^{2+}$ ions and adjusting the pH of the leachate to 4 to 5 such that the $Fe^{2+}$ ions are present in a dissolved state in the leachate and $Al^{3+}$ ions are precipitated as $Al(OH)_3$, adsorbed and coprecipitated with $SiO_2$, and then removed.

5. The method of claim 1 or 4 wherein the reducing agent comprises $NaBH_4$ or $LiBH_4$.

6. The method of claim 1 or 4, wherein the reducing agent is contained in an amount of 0.5 to 0.7 times the number of moles of $Fe^{3+}$ ions.

7. The method of claim 1, wherein in step (2), the polymer adsorption is performed by adding a polymer flocculant solution to the iron ore leachate and stifling and centrifuging the resulting mixture to remove flocculated particles of a silica-polymer flocculant.

8. The method of claim 7, wherein the polymer flocculant comprises at least one selected from the group consisting of polyethylene oxide, polyethylene glycol dodecyl ether, polyethylene glycol tridecyl ether, polyethylene glycol hexadecyl ether, polyethylene glycol octadecyl ether, polyoxyethylene isooctylphenyl ether, polyoxyethylene tetramethylbutyl phenyl ether, polyoxyethylene sorbitan monolaurate, polyoxyethylene sorbitan monostearate, polyoxyethylene sorbitan monooleate, and poloxamer.

9. The method of claim 1, wherein in step (3), the oxidant is $H_2O_2$.

10. The method of claim 1, wherein in step (3) and step (5), the alkaline solution comprises at least one selected from the group consisting of NaOH solution, KOH solution, $Ca(OH)_2$ solution, and $NH_4OH$ solution.

11. Magnetite nanoparticles prepared by the method of claim 1 and comprising 90 to 95 wt % of Fe, 0.1 to 0.5 wt % of Si, and 1 to 5 wt % of Mg.

\* \* \* \* \*